(12) United States Patent
Yasui

(10) Patent No.: US 12,281,662 B2
(45) Date of Patent: Apr. 22, 2025

(54) FLUID PRESSURE ACTUATOR

(71) Applicant: BRIDGESTONE CORPORATION, Tokyo (JP)

(72) Inventor: Hitoshi Yasui, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/713,701

(22) PCT Filed: Sep. 28, 2022

(86) PCT No.: PCT/JP2022/036320
§ 371 (c)(1),
(2) Date: May 28, 2024

(87) PCT Pub. No.: WO2023/112422
PCT Pub. Date: Jun. 22, 2023

(65) Prior Publication Data
US 2025/0027517 A1    Jan. 23, 2025

(30) Foreign Application Priority Data
Dec. 17, 2021 (JP) ................................ 2021-205601

(51) Int. Cl.
*F15B 15/10* (2006.01)
*B25J 9/14* (2006.01)
*F03G 7/00* (2006.01)

(52) U.S. Cl.
CPC ............. *F15B 15/103* (2013.01); *B25J 9/142* (2013.01); *F03G 7/008* (2021.08)

(58) Field of Classification Search
CPC .......... F15B 15/103; B25J 9/142; F03G 7/008
See application file for complete search history.

(56) References Cited

U.S. PATENT DOCUMENTS 4,615,260 A * 10/1986 Takagi .................. F15B 15/103
                                                            92/92
7,104,182 B2 * 9/2006 Reininger ........... F15B 15/2869
                                                            92/5 R
(Continued)

FOREIGN PATENT DOCUMENTS

CN        105818143 A      8/2016
DE        20317790 U1      1/2004
(Continued)

OTHER PUBLICATIONS

Dec. 13, 2022, International Search Report issued in the International Patent Application No. PCT/JP2022/036320.
(Continued)

*Primary Examiner* — Hoang M Nguyen
(74) *Attorney, Agent, or Firm* — KENJA IP LAW PC

(57) ABSTRACT

A fluid pressure actuator according to this disclosure is a fluid pressure actuator that expands and contracts by fluid pressure, including an attachment attached to the distal end side, wherein the attachment is a spatular portion including a holding surface at one side in the thickness direction, and the spatular portion includes: a thin-walled portion at the distal end side; and a bump thick-walled portion that is located at the proximal end side of the thin-walled portion and is thicker than the thin-walled portion by a bump portion that protrudes or is able to protrude on the holding surface.

12 Claims, 13 Drawing Sheets

(56) References Cited

U.S. PATENT DOCUMENTS

| | | | |
|---|---|---|---|
| 9,046,177 B2 | 6/2015 | Tell | |
| 11,247,348 B2 | 2/2022 | Lessing et al. | |
| 2009/0223361 A1 | 9/2009 | Matsushita et al. | |
| 2016/0263751 A1 | 9/2016 | Galloway | |
| 2016/0375590 A1* | 12/2016 | Lessing | B25J 15/12 |
| | | | 294/196 |
| 2019/0373805 A1* | 12/2019 | Wataya | B60K 35/50 |
| 2021/0395927 A1* | 12/2021 | Kanesugi | F15B 15/10 |

FOREIGN PATENT DOCUMENTS

| | | |
|---|---|---|
| DE | 102016125271 A1 | 6/2018 |
| JP | H09109078 A | 4/1997 |
| JP | 2014532844 A | 12/2014 |
| JP | 2018520896 A | 8/2018 |
| JP | 2021088999 A | 6/2021 |
| WO | 2007058107 A1 | 5/2007 |
| WO | 2007058327 A1 | 5/2007 |

OTHER PUBLICATIONS

Jun. 13, 2024, International Preliminary Report on Patentability issued in the International Patent Application No. PCT/JP2022/036320.

Feb. 27, 2025, search result of the Extended European Search Report issued by the European Patent Office in the corresponding European Patent Application No. 22906957.0.

* cited by examiner

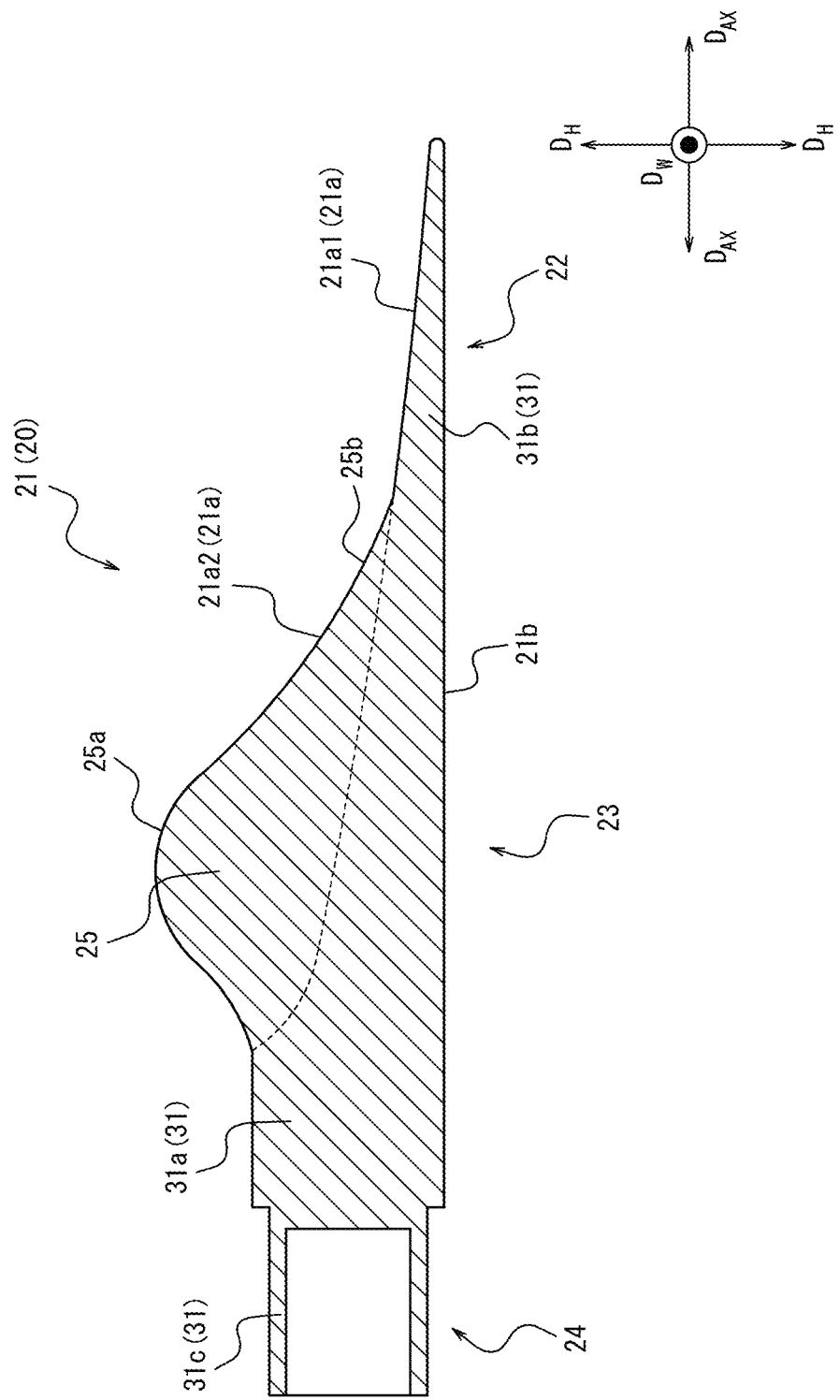

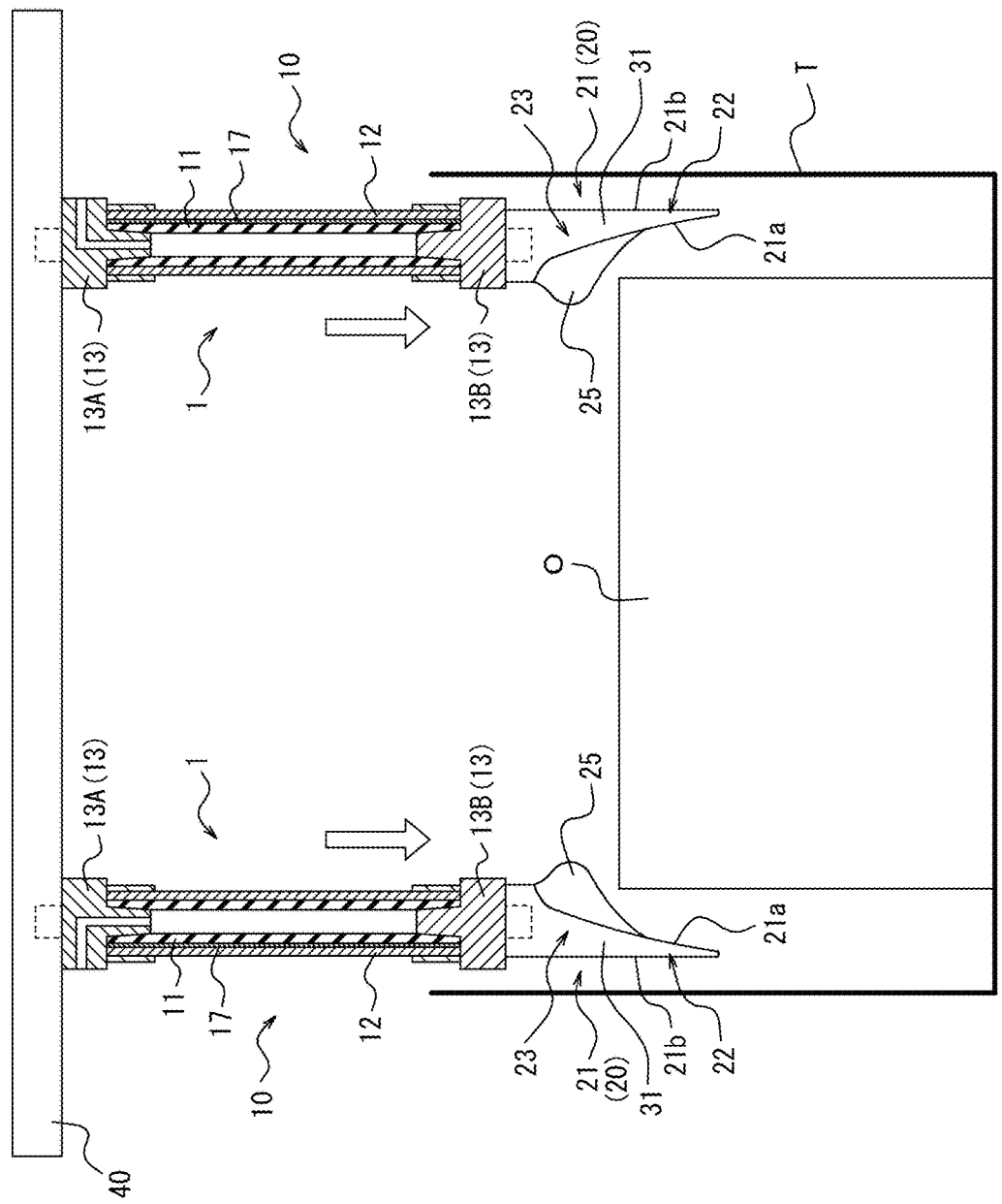

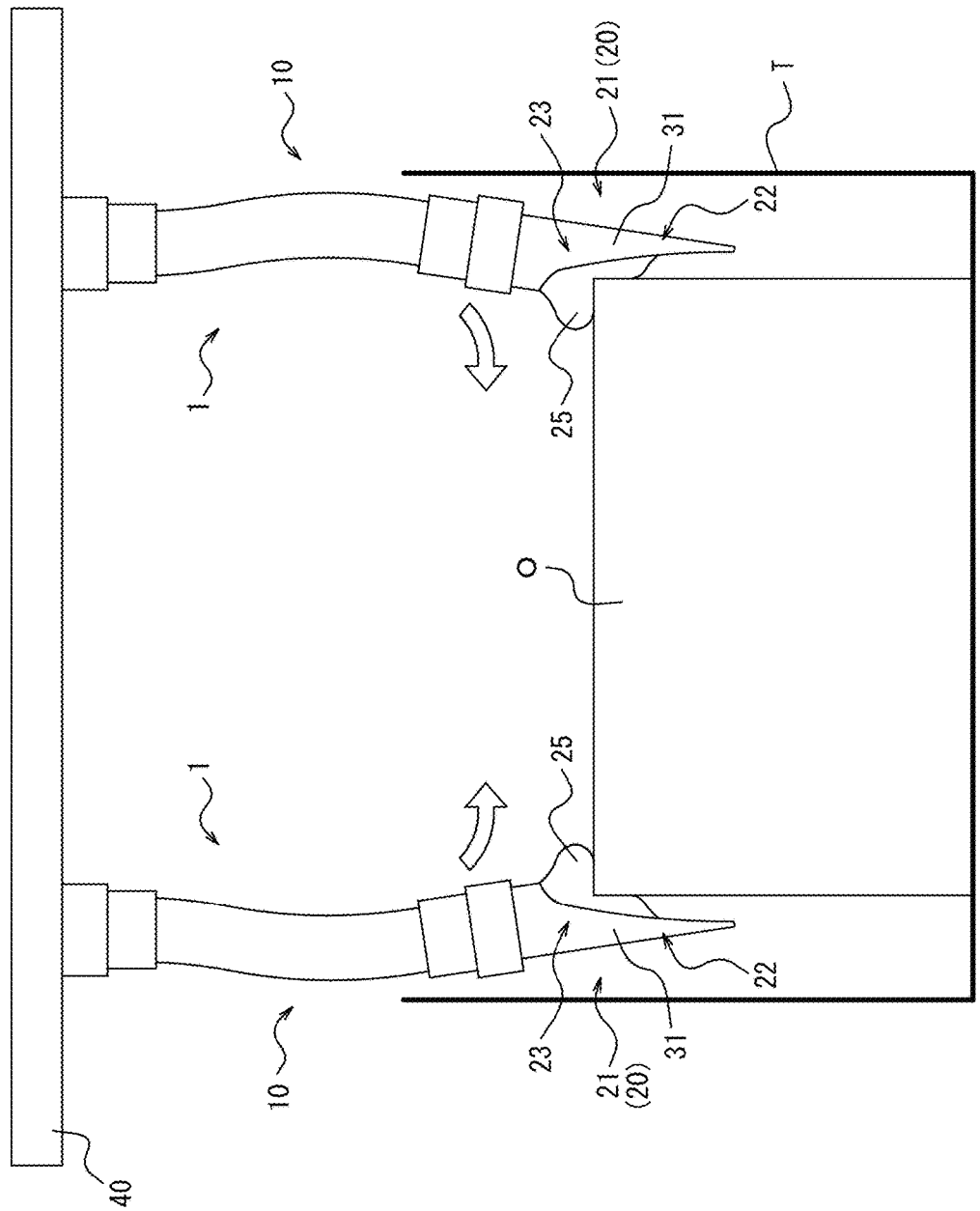

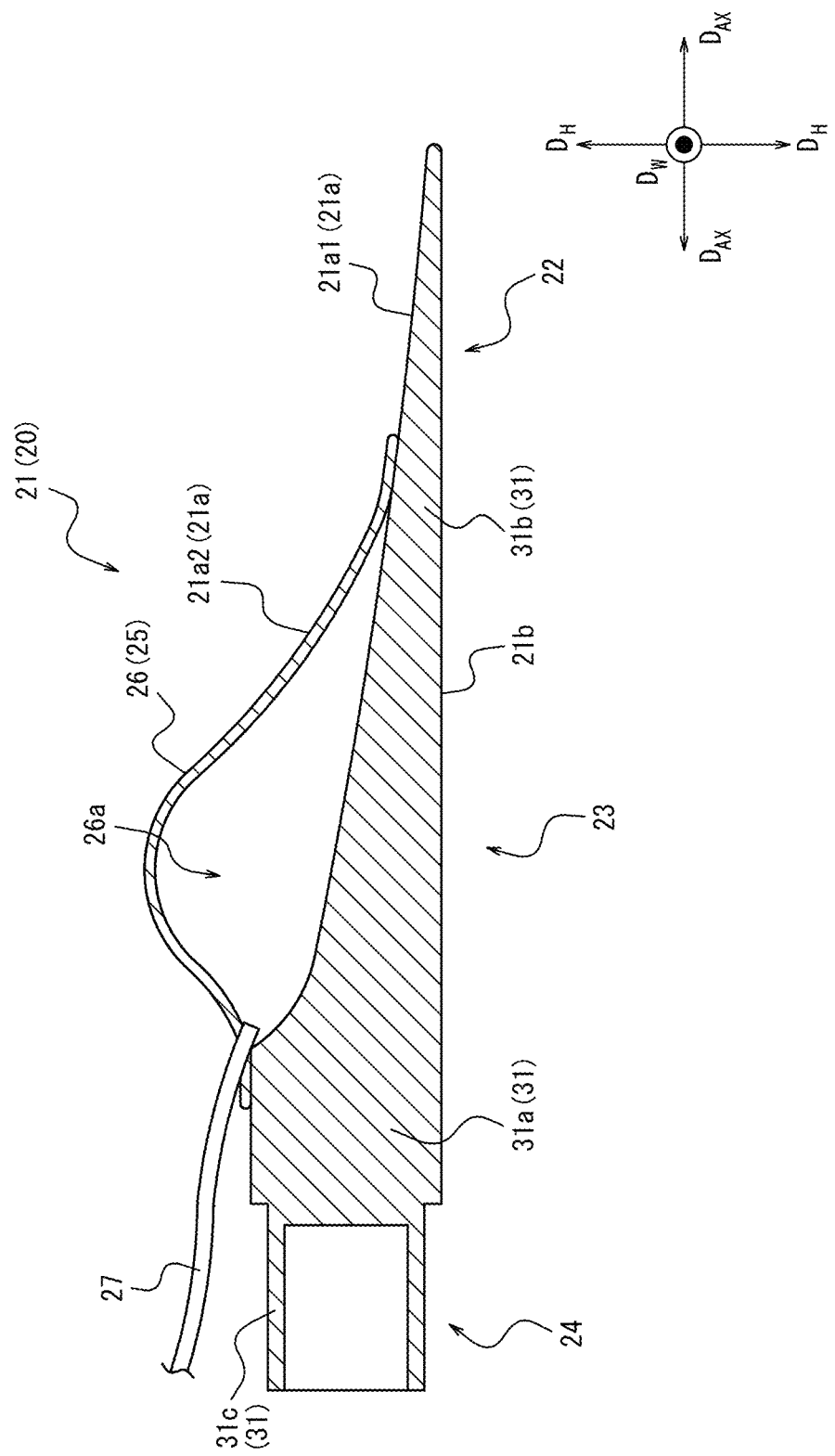

FLUID PRESSURE ACTUATOR

TECHNICAL FIELD

This disclosure relates to a fluid pressure actuator.

BACKGROUND

Conventionally, there is known a fluid pressure actuator for expanding and contracting a tube using gas or liquid. For example, PTL 1 discloses a fluid pressure actuator (so-called Mckibben type fluid pressure actuator) having a structure including a rubber tube that expands and contracts by air pressure and a sleeve that covers the outer circumferential surface of the tube.

CITATION LIST

Patent Literature

PTL 1: JP2021-088999A

SUMMARY

Technical Problem

In recent years, it is required a further improvement in usability of fluid pressure actuators amid the advance in the application to robotic arms and the like of the fluid pressure actuators.

In consideration of the above condition, it could be helpful to improve the usability of a fluid pressure actuator.

Solution to Problem

A fluid pressure actuator according to this disclosure is a fluid pressure actuator that expands and contracts by fluid pressure, including an attachment attached to the distal end side, wherein the attachment is a spatular portion including a holding surface at one side in the thickness direction, and the spatular portion includes: a thin-walled portion at the distal end side; and a bump thick-walled portion that is located at the proximal end side of the thin-walled portion and is thicker than the thin-walled portion by a bump portion that protrudes or is able to protrude on the holding surface.

Advantageous Effect

According to this disclosure, the usability of a fluid pressure actuator can be improved.

BRIEF DESCRIPTION OF THE DRAWINGS

In the accompanying drawings:

FIG. 5C is a cross-sectional view of the attachment at B-B' in FIG. 5B;

FIG. 6A is a schematic diagram illustrating an operation of the fluid pressure actuator illustrated in FIG. 1;

FIG. 6B is a schematic diagram illustrating an operation of the fluid pressure actuator illustrated in FIG. 1;

FIG. 7A is a drawing illustrating one modification of the attachment illustrated in FIG. 5A to FIG. 5C;

DETAILED DESCRIPTION

Embodiments of a fluid pressure actuator according to this disclosure will be described hereinafter with reference to the drawings. Configurations common between the drawings have the same reference signs. However, it should be noted that the drawings are schematic, and ratios of dimensions and the like may be different from actual ones.

(Outline of Fluid Pressure Actuator)

Figure 1:
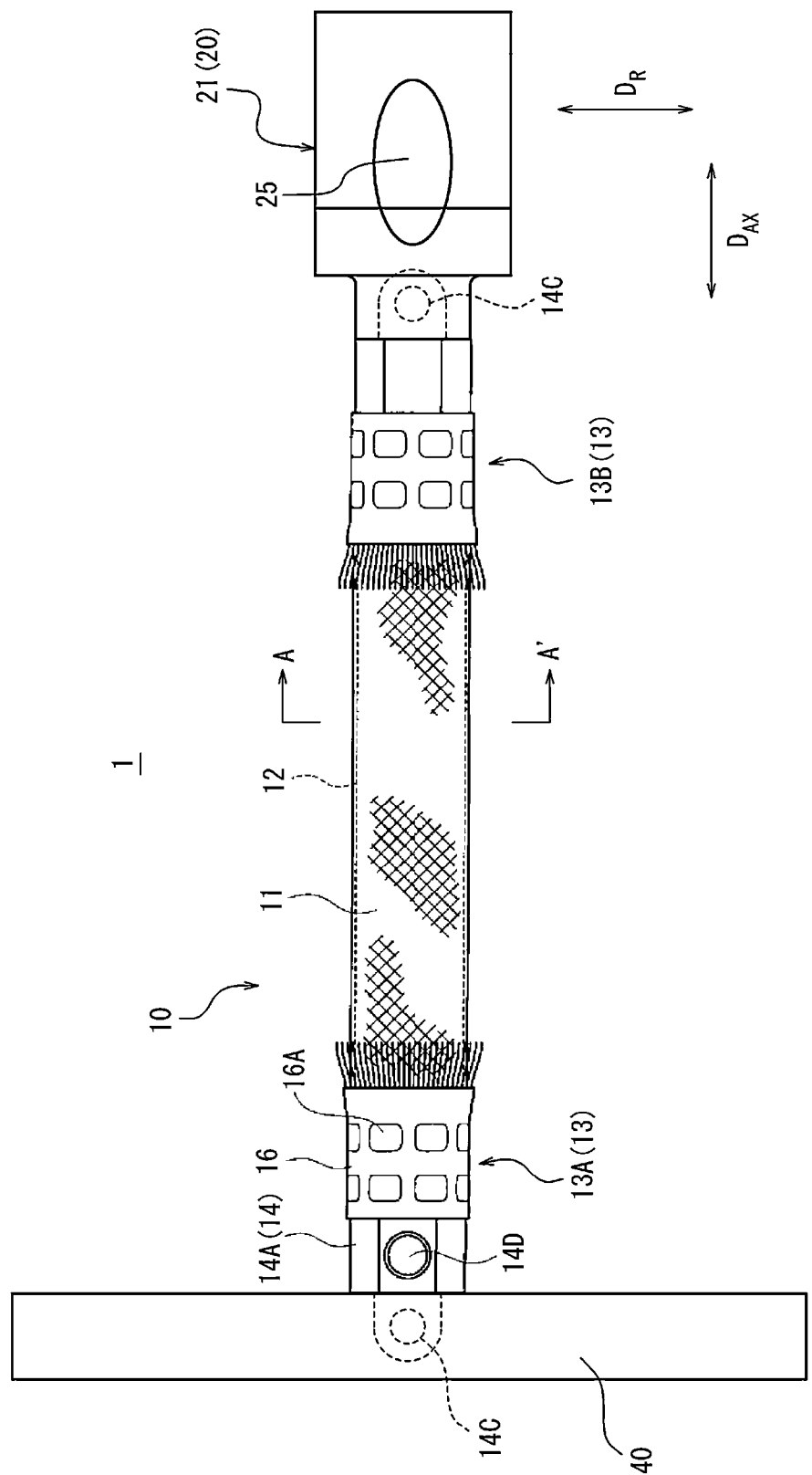
FIG. 1 is a side view of a fluid pressure actuator according to one of the disclosed embodiments.
Figure 2:
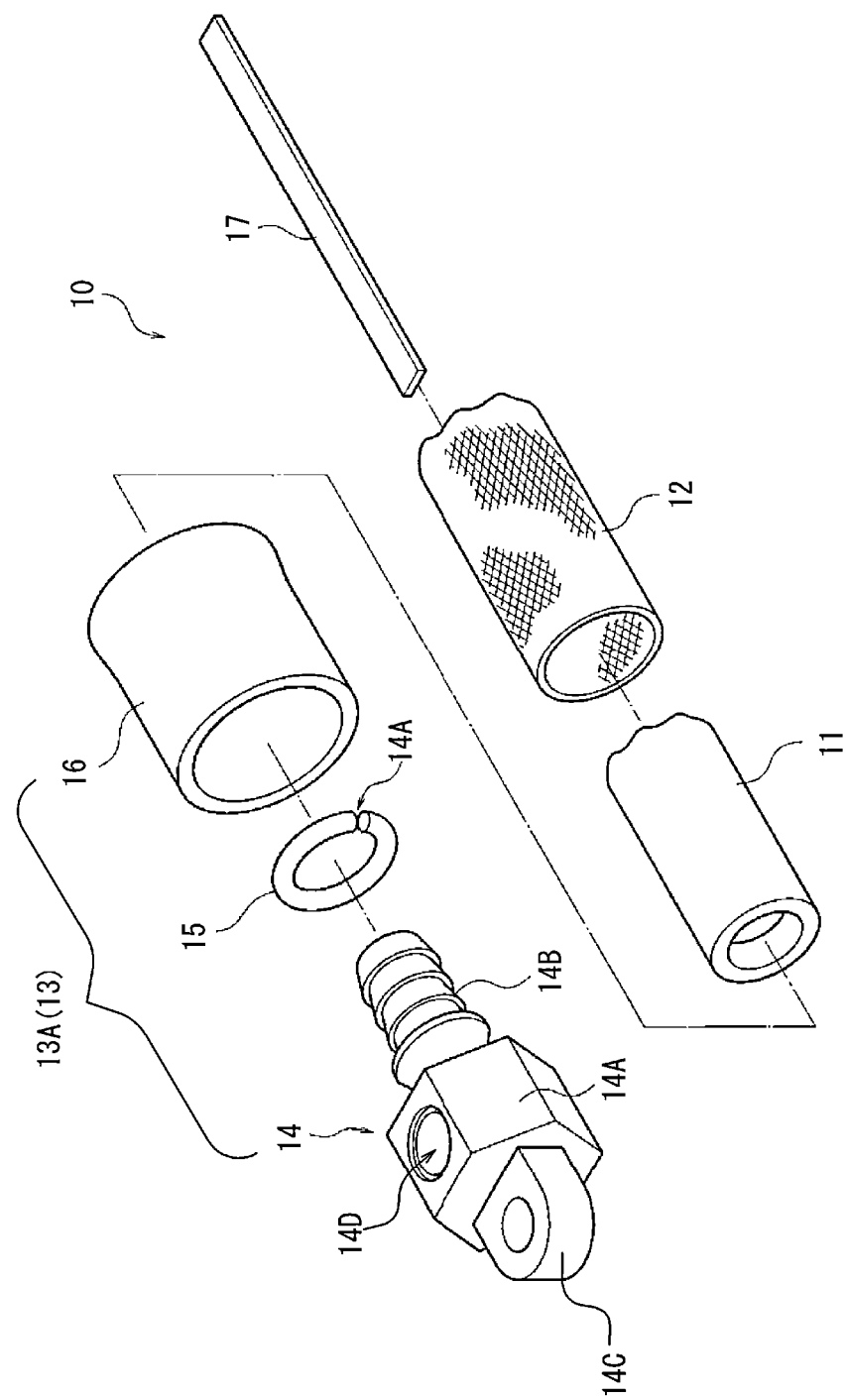
FIG. 2 is a partially exploded perspective view of the fluid pressure actuator illustrated in FIG. 1.
Figure 3:
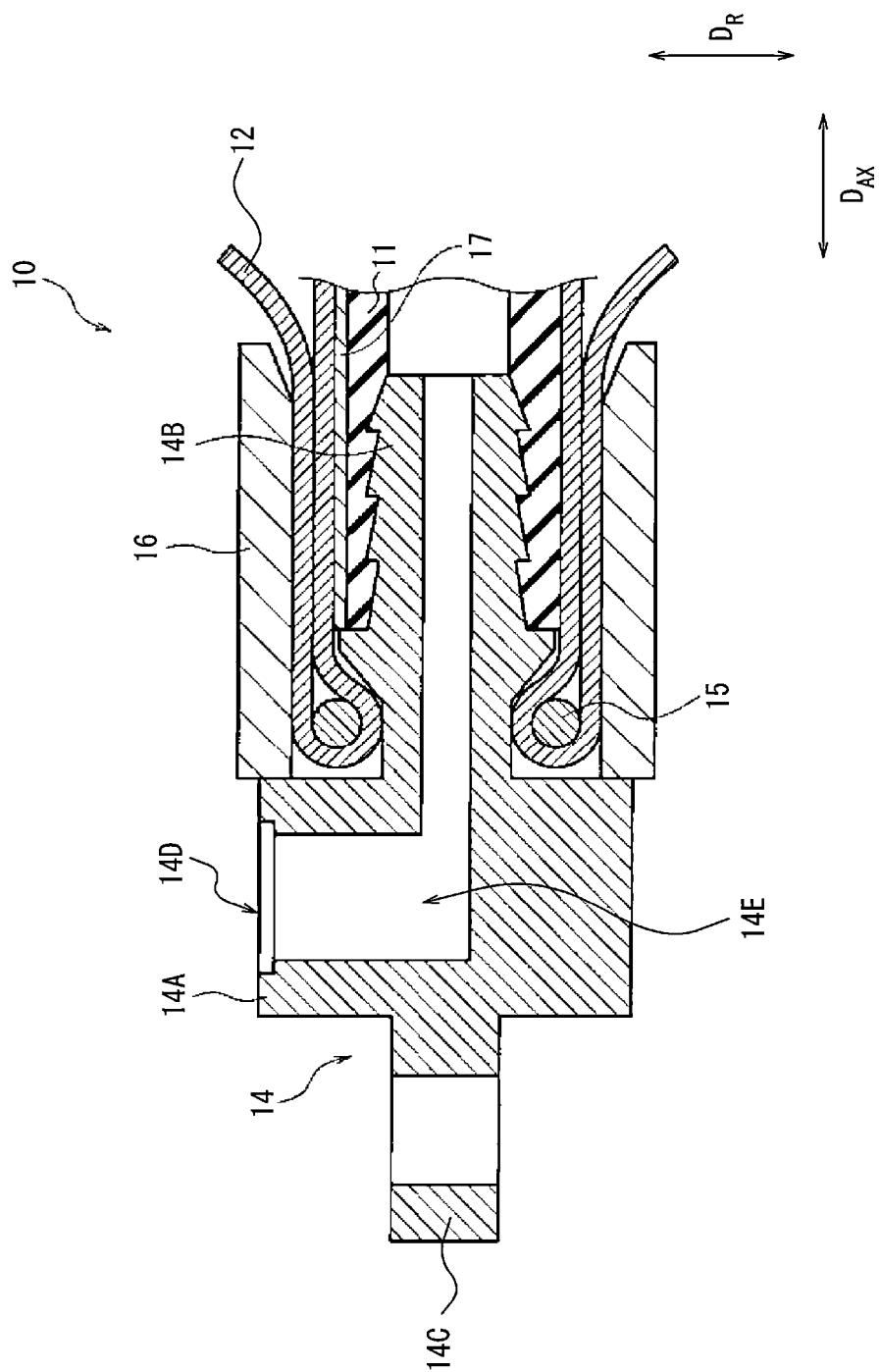
FIG. 3 is a partial sectional view along the axis direction of the fluid pressure actuator including a sealing portion at the proximal end side illustrated in FIG. 1.
Figure 4:
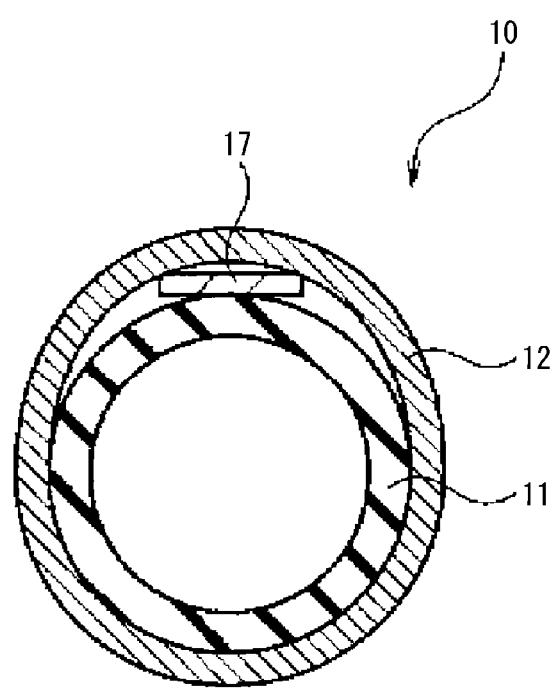
FIG. 4 is a cross-sectional view of the fluid pressure actuator at A-A' in FIG. 1.

First, with reference to FIG. 1, FIG. 2, FIG. 3, and FIG. 4, it is described the outline of a fluid pressure actuator 1 according to a first embodiment of this disclosure. The fluid pressure actuator 1 of this embodiment is a Mckibben type fluid pressure actuator. However, the configuration of the fluid pressure actuator 1 is not limited to this. The fluid pressure actuator 1 may be another fluid pressure actuator. FIG. 1 is a side view of the fluid pressure actuator 1 according to this embodiment. FIG. 2 is a partially exploded perspective view of the fluid pressure actuator 1. FIG. 3 is a partial sectional view along the axis direction of the fluid pressure actuator 1 including a first sealing portion 13A illustrated in FIG. 1. FIG. 4 is a cross-sectional view along the radial direction of the fluid pressure actuator at A-A' in FIG. 1.

As illustrated in FIG. 1, the fluid pressure actuator 1 includes an actuator portion 10, an attachment 20, and a supporting portion 40. The actuator portion 10 includes a tube 11, a sleeve 12, the first sealing portion 13A, a second sealing portion 13B, and a constraint member 17.

Fluid can be flowed into the tube 11 of the fluid pressure actuator 1 through a connecting port 14D provided on the first sealing portion 13A. The actuator portion 10 contracts in the axis direction of the actuator portion 10 and expands in the radial direction by the flow of the fluid into the tube 11. On the other hand, the actuator portion 10 expands in the axis direction of the actuator portion 10 and contracts in the radial direction by the flow of the fluid from the tube 11. The fluid pressure actuator 1 can achieve a function as an actuator with such change in form of the actuator portion 10.

The fluid pressure actuator 1 as described above is what is called a Mckibben type actuator, which is applicable to artificial muscles and can also be used as limbs, hands, or fingers of a robot, which require higher capacity (contraction force) than artificial muscles.

The fluid used for driving the fluid pressure actuator 1 may be any of gas such as air or liquid such as water and mineral oil. However, in particular, the fluid pressure actuator 1 can have high durability capable of resisting hydraulic drive with which high pressure is applied to the actuator portion 10.

The following describes the components of the fluid pressure actuator 1 in detail with reference to the drawings.

The tube 11 is a cylindrical pipe-like body that expands and contracts by fluid pressure. The tube 11, which is to repeat contracting and expanding movements alternately by the fluid, is formed of an elastic material such as butyl rubber. However, when the fluid pressure actuator 1 is hydraulically driven, the elastic member forming the tube 11 may be NBR (nitrile rubber) with high oil resistance or at least one selected from the group consisting of hydrogenated NBR, chloroprene rubber, and epichlorohydrin rubber.

In this disclosure, the direction in which the tube 11 extends, that is, the direction parallel to the central axis of the tube 11 is referred to as an axis direction of the tube 11. The direction orthogonal to the axis direction of the tube 11 is referred to as a radial direction of the tube 11. The direction around the central axis of the tube 11 is referred to as a circumferential direction of the tube 11. Hereinafter, the axis direction of the tube 11, the radial direction of the tube 11, and the circumferential direction of the tube 11 are also simply referred to as an "axis direction", a "radial direction", and a "circumferential direction", respectively. In the drawings, the "axis direction" is indicated by "DAX", and the "radial direction" is indicated by "DR". In this disclosure, in the fluid pressure actuator 1, the side on which the attachment 20 is provided is referred to as a "distal end side", and the side opposite to the distal end side is referred to as a "proximal end side", along the axis direction of the tube 11. Furthermore, in this disclosure, the side near the central axis of the tube 11 is referred to as an "inside in the radial direction", and the side far from the central axis of the tube 11 is referred to as an "outside in the radial direction", in the radial direction of the tube 11.

The sleeve 12 is cylindrical and covers the outer circumferential surface of the tube 11. The sleeve 12 has a stretchable structure formed by weaving fiber cords to be disposed in certain directions, and the cords thus disposed intersect each other in a woven manner to provide rhombus configurations in a repetitive and continuous manner. The sleeve 12 having such a shape can deform like a pantograph and follow contraction and expansion of the tube 11, while also regulating the contraction and expansion.

It is preferable to use, as the fiber cord of the sleeve 12, a fiber cord made of aromatic polyamide (aramid fiber) or polyethylene terephthalate (PET). However, the fiber cord of the sleeve 12 is not limited to such fiber cords and may be, for example, a cord made of a high strength fiber such as poly para-phenylene benzobisoxazole (PBO) fiber.

The first sealing portion 13A and the second sealing portion 13B seal the end portions (the distal end and the proximal end) of the tube 11 in the axis direction, respectively. In this embodiment, the first sealing portion 13A seals the proximal end of the tube 11 in the axis direction, and the second sealing portion 13B seals the distal end of the tube 11 in the axis direction. In this disclosure, the first sealing portion 13A and the second sealing portion 13B are collectively simply referred to as "sealing portions 13" unless otherwise differentiated.

As illustrated in FIG. 2, the sealing portion 13 (the first sealing portion 13A in FIG. 2) includes a sealing member 14, a locking ring 15, and a caulking member 16.

The sealing member 14 seals the end portion in the axis direction of the tube 11. The sealing member 14 has a head portion 14A and a body portion 14B extending in the axis direction from the head portion 14A. The body portion 14B is inserted into the tube 11 from the outside in the axis direction of the tube 11. The sealing member 14 may also include a connecting portion 14C for connecting other members, in addition to the head portion 14A and the body portion 14B.

The connecting portion 14C projects from the head portion 14A to the side opposite to the body portion 14B in the axis direction. A through hole extending in the radial direction may be defined in the connecting portion 14C to facilitate the connection of other members. With reference to FIG. 1, in this embodiment, the supporting portion 40 supporting the actuator portion 10 is attached to the connecting portion 14C of the first sealing portion 13A, and the attachment 20 is attached to the connecting portion 14C of the second sealing portion 13B.

Metal such as stainless steel is used to form the sealing member 14. However, the material for the sealing member 14 is not limited to such metal, and a hard plastic material or the like may be used to form the sealing member 14.

With reference to FIG. 2 again, the locking ring 15 is a ring-shaped member that locks the sleeve 12 to the sealing member 14. Specifically, as illustrated in FIG. 3, the sleeve 12 is folded to the outside in the radial direction via the locking ring 15.

With reference to FIG. 2 again, a notch portion 15A that is partially cut to be engaged with the sealing member 14 is formed on the locking ring 15. Materials such as metal, a hard plastic material, or the like, i.e., those similar to the materials for the sealing member 14, or materials such as natural fibers (thread of natural fibers) or rubber (for example, O-ring) can be used as a material to form the locking ring 15.

The caulking member 16 caulks the tube 11 and the sleeve 12 together with the sealing member 14. The caulking member 16 is a pipe-like member with an outer diameter larger than that of the body portion 14B of the sealing member 14. The caulking member 16 is provided to cover the outside in the radial direction of the part into which the sealing member 14 is inserted, of the tube 11 and the sleeve 12 and caulked by a jig to clamp the tube 11 and the sleeve 12 to tightly adhere and fix them to the sealing member 14.

The caulking member 16 may be formed of metal such as aluminum alloy, brass, or iron. As illustrated in FIG. 1, indentations 16A as marks made by the jig may be formed on the outer circumferential surface of the caulking member 16.

The difference between the first sealing portion 13A and the second sealing portion 13B is whether the connecting port 14D and a passage hole 14E are provided on the sealing member 14 or not. As illustrated in FIG. 3, in this embodiment, the connecting port 14D and the passage hole 14E are provided on the sealing member 14 of the first sealing portion 13A.

A driving pressure source of the fluid pressure actuator 1, specifically, a hose (piping path) connected with a compressor of gas or liquid is attached to the connecting port 14D. The fluid which has flowed into the fluid pressure actuator 1 via the connecting port 14D then flows into the inside of the tube 11, through the passage hole 14E defined inside the sealing member 14. In this embodiment, the connecting port 14D is provided to open toward the outside in the radial direction of the head portion 14A of the sealing member 14. The passage hole 14E is formed over the head portion 14A and the body portion 14B. The connecting port 14D is in communication with the inside of the tube 11 via the passage hole 14E.

With reference to FIG. 2 again, a constraint member 17 is provided inside in the radial direction of the sleeve 12. The constraint member 17 is provided from the proximal end side to the distal end side in the axis direction, inside in the radial direction of the sleeve 12.

The constraint member 17 is not compressed in the axis direction and can deform only in the radial direction (also referred to as a deflection direction). That is, the constraint member 17 resists the compression along the axis direction and can bendingly deform in the orthogonal direction (radial direction) orthogonal to the axis direction.

The constraint member 17 constrains (regulates) the expansion of the tube 11 (and the sleeve 12) to the outside in the radial direction, at a position in the circumferential direction of the tube 11 on which the constraint member 17 is provided.

The constraint member 17 is formed of, for example, a leaf spring. The dimensions of the leaf spring may be selected depending on the size of the actuator portion 10 and a required generative force and are not specifically limited. The material of the leaf spring is also not specifically limited but typically may be a material that is easily bent and resistant to compression, such as metal including stainless steel. For example, the constraint member 17 may be formed of a thin plate of carbon fiber reinforced plastic (CFRP). The CFRP is less likely to be plastically deformed compared with metal, and the actuator portion 10 is thus likely to return to the original straight state after curving.

As illustrated in FIG. 4, the constraint member 17 is provided between the tube 11 and the sleeve 12. FIG. 4 is a cross-sectional view along the radial direction of the fluid pressure actuator 1 at A-A' in FIG. 1. The constraint member 17 may tightly adhere to the tube 11 and the sleeve 12, or a certain clearance may be formed between the constraint member 17 and the tube 11 and/or the sleeve 12, and at the side of the constraint member 17. However, the constraint member 17 may be buried in the tube 11 or provided inside in the radial direction of the tube 11.

The constraint member 17 is provided at a part in the circumferential direction of the tube 11 (and the sleeve 12). That is, the tube 11 has a part covered with the constraint member 17 and an uncovered part in the circumferential direction. The width of the tube 11 is not specifically limited. However, when the outer diameter of the tube 11 is used as a benchmark, the width of the tube 11 may be, for example, about half of this outer diameter.

In this embodiment, the constraint member 17 is plate-like but may be somewhat curved along the cross-section shapes of the tube 11 and the sleeve 12 within the range having no effect on the way of deflection.

The constraint member 17 is provided from the proximal end side to the distal end side in the axis direction of the tube 11 and the sleeve 12. Specifically, the constraint member 17 may be provided from the first sealing portion 13A to the second sealing portion 13B. In this embodiment, the constraint member 17 has a length approximately equal to that of the tube 11.

However, the constraint member 17 does not need to be entirely provided from the first sealing portion 13A to the second sealing portion 13B. The constraint member 17 does not need to extend to any one of the first sealing portion 13A and the second sealing portion 13B (in particular, the second sealing portion 13B side that is highly likely to be a free end when curving).

With reference to FIG. 1 again, the attachment 20 is continuous with the actuator portion 10 at the distal end side in the axis direction of the tube 11. The attachment 20 is a hand portion that contacts with an object when the fluid pressure actuator 1 is driven to apply pressure to or hold the object. In this embodiment, the attachment 20 is attached to the sealing member 14 included in the second sealing portion 13B of the actuator portion 10, from the distal end side in the axis direction.

Figure 5A:
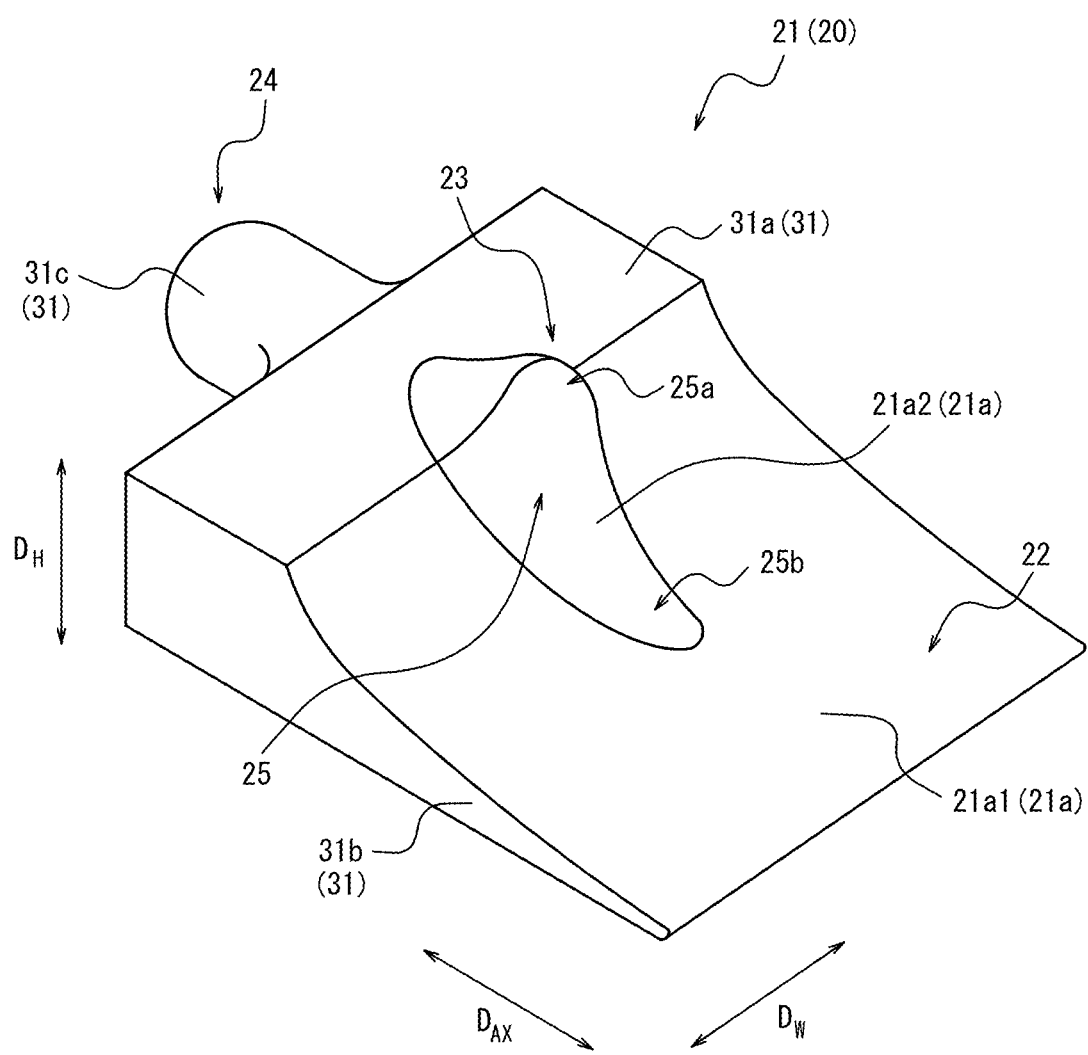
FIG. 5A is a perspective view illustrating an attachment illustrated in FIG. 1.
Figure 5B:
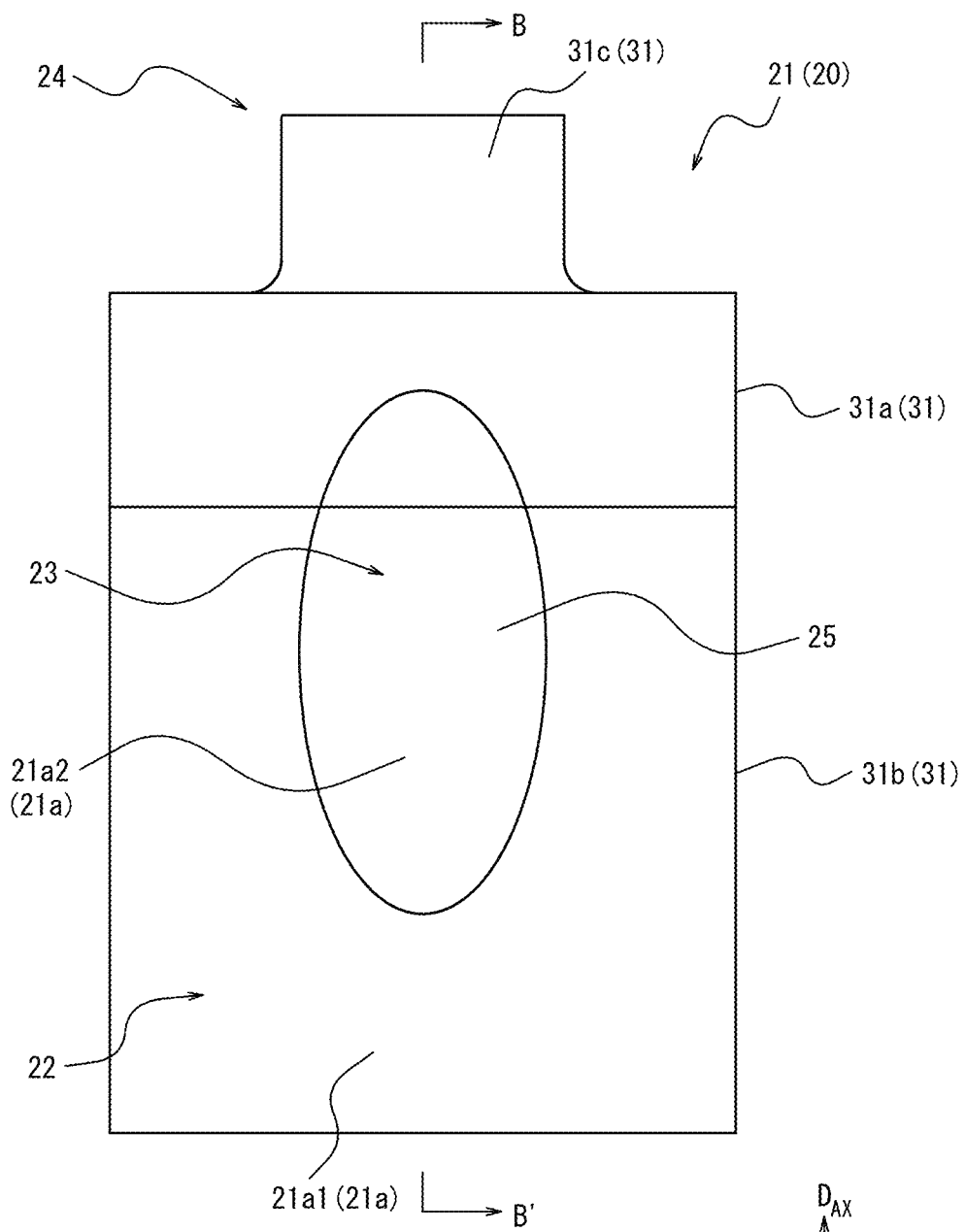
FIG. 5B is a side view of the attachment illustrated in FIG. 5A.

FIG. 5A is a perspective view illustrating the attachment 20 illustrated in FIG. 1. FIG. 5B is a side view of the attachment 20. FIG. 5C is a cross-sectional view of the attachment 20 at B-B' in FIG. 5B. The attachment 20 is a spatular portion 21 that includes a holding surface 21a at one side in the thickness direction. In FIG. 5A to FIG. 5C, the "thickness direction of the spatular portion 21" is indicated by "DH". The attachment 20 being the spatular portion 21 is likely to take out, for example, an object such as a workpiece housed in a container such as a cardboard box. The detail of the spatular portion 21 as the attachment 20 and the detail of an operation of holding the object by the spatular portion 21 will be described below (see FIG. 6A and FIG. 6B).

The attachment 20 may be formed of, for example, a material such as rubber, plastic, and metal. However, the material of the attachment 20 is not limited to such material. The attachment 20 may be formed of any material depending on the application of the fluid pressure actuator 1. As described below, the spatular portion 21 as the attachment 20 may include, for example, an extensional membrane portion 26 that is extensible by fluid (see FIG. 7A).

The attachment 20 may be attachable to/removable from the actuator portion 10. In this embodiment, the attachment 20 includes a connecting portion 24 that is attachable to/removable from the connecting portion 14C provided at the distal end side in the axis direction of the sealing member 14 included in the second sealing portion 13B. That is, the attachment 20 of this embodiment can be attachable to/removable from the connecting portion 14C of the actuator portion 10 using the connecting portion 24. This can facilitate the replacement of the attachment 20 when the attachment 20 breaks. However, the attachment 20 does not need to be attachable to/removable from the actuator portion 10. For example, the attachment 20 may be integrated with the sealing member 14 included in the second sealing portion 13B.

(Operation of Fluid Pressure Actuator)

The following describes an operation of the fluid pressure actuator 1 according to one of the disclosed embodiments with reference to FIG. 6A and FIG. 6B. FIG. 6A and FIG. 6B are each a schematic diagram illustrating an operation of the fluid pressure actuator 1 illustrated in FIG. 1. FIG. 6A and FIG. 6B each illustrate an operation of holding and taking out an object O such as a workpiece inside a container T such as a cardboard, using two fluid pressure actuators 1. In FIG. 6A and FIG. 6B, the two fluid pressure actuators 1 are fixed to one supporting portion 40, at the proximal end side of the actuator portions 10. In other words, the two fluid pressure actuators 1 are in a state where the distal end sides are freely movable. That is, the proximal end sides of the fluid pressure actuators 1 are fixed ends, and the distal end sides are free ends.

As described above, when the fluid flows into the tube 11 of the fluid pressure actuator 1, the tube 11 is to contract in the axis direction. However, since the constraint member 17 is provided over in the axis direction on a part in the circumferential direction of the tube 11, the contraction along the axis direction of the tube 11 is constrained (regulated) at the part in the circumferential direction on which the constraint member 17 is provided, of the tube 11. On the other hand, since a part on which the constraint member 17 is not provided, of the tube 11 is to contract, the constraint member 17 functions as a backbone, and each fluid pressure actuator 1 (specifically, the tube 11 and the sleeve 12 of each fluid pressure actuator 1) deflects at the side opposite to the position in the circumferential direction of the tube 11 on which the constraint member 17 is provided. In FIG. 6A and FIG. 6B, the free ends at the distal end sides of the two fluid pressure actuators 1 deflect in a direction in which the two fluid pressure actuators 1 are opposed to one another such that the free ends mutually approach.

On the other hand, when the fluid flows out of the inside of the fluid pressure actuator 1, the fluid pressure actuator 1 returns to the original linear posture. This can use the fluid pressure actuators 1 as, for example, a robotic arm, or fingers of a robot hand. For example, as illustrated in FIG. 6A and FIG. 6B, when the two fluid pressure actuators 1 are driven to sandwich from the sides and raise the object O housed in the container T, the respective attachments 20 of the two fluid pressure actuators 1 are inserted into clearances between the inner wall of the container T and the sidewall of the object O (see the open arrows in FIG. 6A) to cause the two fluid pressure actuators 1 to deflect in the mutually opposed direction (see the open arrows in FIG. 6B), which can cause the two attachments 20 to sandwich and raise the object O.

FIG. 6A and FIG. 6B each exemplify the operation of holding and raising the object O using the two fluid pressure actuators 1. However, the number of the fluid pressure actuators 1 is not limited to two. The number of the fluid pressure actuators 1 that hold and raise the object O may be three or more.

As described above, the attachment 20 is the spatular portion 21 including the holding surface 21a at one side in the thickness direction.

As illustrated in FIG. 5A to FIG. 5C, the spatular portion 21 includes a thin-walled portion 22, a bump thick-walled portion 23, and the connecting portion 24. The thin-walled portion 22 is a flat plate-like part at the distal end side of the spatular portion 21. The bump thick-walled portion 23 is located at the proximal end side of the thin-walled portion 22. The bump thick-walled portion 23 is a part that is thicker than the thin-walled portion 22 by a bump portion 25 that protrudes on the holding surface 21a. The connecting portion 24 is a part connected to the actuator portion 10, of the spatular portion 21. The spatular portion 21 of this embodiment is attachable to/removable from the actuator portion 10 via the connecting portion 24. However, the spatular portion 21 may be unattachably/unremovably connected to the actuator portion 10.

The spatular portion 21 including the above thin-walled portion 22 facilitates the insertion into the clearance between the inner wall of the container T and the sidewall of the object O. The spatular portion 21 including the above bump thick-walled portion 23 can increase the gripping force to hold the object O. The configuration with the thin-walled portion 22 alone improves the insertability into the clearance but limits the gripping performance to the object O. In contrast, the configuration with the bump thick-walled portion 23 alone improves the gripping performance to the object O but limits the insertability into the clearance. That is, the spatular portion 21 including the above thin-walled portion 22 and bump thick-walled portion 23 can achieve the balance of the insertability into the clearance and the gripping performance to the object O to be held. This can improve the usability of the fluid pressure actuator 1.

The thin-walled portion 22 includes the distal end of the spatular portion 21. The thin-walled portion 22 of this embodiment extends from the distal end of the bump thick-walled portion 23 to the distal end of the spatular portion 21 in the extending direction of the spatular portion 21 (the same direction as the axis direction of the tube 11). The thickness of the thin-walled portion 22 of this embodiment is configured to gradually decrease from the proximal end side toward the distal end side but may be even. However, the thin-walled portion 22 preferably gradually decreases from the proximal end side toward the distal end side as in this embodiment. This makes the distal end of the spatular portion 21 formed of the distal end of the thin-walled portion 22 be more likely to insert into between the inner wall of the container T and the sidewall of the object O when the fluid pressure actuators 1 are used to hold and raise the object O inside the container T (see FIG. 6A and FIG. 6B).

The bump thick-walled portion 23 of this embodiment is continuous with the proximal end side of the thin-walled portion 22. As illustrated in FIG. 5A and FIG. 5B, the bump thick-walled portion 23 of this embodiment is formed on only the center in the width direction of the spatular portion 21. However, the configuration of the bump thick-walled portion 23 is not limited to this. Other configuration examples of the bump thick-walled portion 23 will be described below (see FIG. 7A to FIG. 7C). In FIG. 5A to FIG. 5C, the "width direction of the spatular portion 21" is indicated by "DW".

As illustrated in FIG. 5C, the holding surface 21a of the spatular portion 21 of this embodiment includes: an distal end-side holding surface 21a1 located at one side (upper side in FIG. 5C) of the thin-walled portion 22 in the thickness direction of the spatular portion 21; and a proximal end-side holding surface 21a2 located at one side (upper side in FIG. 5C) of the bump thick-walled portion 23 in the thickness direction of the spatular portion 21. The proximal end-side holding surface 21a2 is a bump surface formed by the bump portion 25.

As illustrated in FIG. 5C, the holding surface 21a is preferably continuous from the position of the thin-walled portion 22 to the position of an apex 25a of the bump portion 25 of the bump thick-walled portion 23 without any steps. More specifically, the above distal end-side holding surface 21a1 of the thin-walled portion 22 is preferably continuous with the above proximal end-side holding surface 21a2 of the bump thick-walled portion 23 without any steps. Furthermore, the proximal end-side holding surface 21a2 of the bump thick-walled portion 23 is preferably continuous from the position of a skirt 25b of the bump portion 25 continuous with the distal end-side holding surface 21a1 to the apex 25a of the bump portion 25 without any steps. This can restrain the object O (see FIG. 6A and FIG. 6B) held by the holding surface 21a from being caught on the steps of the holding surface 21a to fall, break, etc. Accordingly, this makes the holding surface 21a be likely to hold the object O with a desired posture.

The shape of the bump portion 25 is not specifically limited so long as the bump portion 25 is continuous from the skirt 25b to the apex 25a without any steps. However, as illustrated in FIG. 5C, it is preferable that the proximal end-side holding surface 21a2 of the bump thick-walled portion 23 is a recessed curved surface at the position of the skirt 25b of the bump portion 25 continuous with the distal end-side holding surface 21a1 and is a protruding curved surface at the position of the apex 25a. As illustrated in FIG. 5C, it is also preferable that these recessed curved surface and protruding curved surface being smoothly continuous with one another causes the proximal end-side holding surface 21a2 of the bump thick-walled portion 23 to form a surface that is continuous from the skirt 25b to the apex 25a without any steps. This can restrain the object O (see FIG. 6A and FIG. 6B) from being accidentally caught at the position of the proximal end-side holding surface 21a2 of the holding surface 21a and facilities the acquisition of high gripping performance to the object O of the proximal end-side holding surface 21a2.

Moreover, the bump portion 25 is preferably elastically deformable in the thickness direction of the spatular portion 21. Examples of such a bump portion 25 include a rubber bump portion 25. When the bump portion 25 applies a pressure to and holds the object O (see FIG. 6A and FIG. 6B), the bump portion 25 compressively deforms in the thickness direction of the spatular portion 21, which can more increase the gripping performance to the object O of the proximal end-side holding surface 21a2. The configuration of the bump portion 25 that is elastically deformable in the thickness direction of the spatular portion 21 is not limited to that of this embodiment. As described below, the bump portion 25 may be formed by the extensional membrane portion 26 that is extensible by fluid (see FIG. 7A).

The spatular portion 21 further includes a slip surface 21b at the back side of the holding surface 21a in the thickness direction. The slip surface 21b has smaller friction than the holding surface 21a. More specifically, the slip surface 21b is formed by a surface with smaller friction resistance than the holding surface 21a. The slip surface 21b may be subjected to, for example, various kinds of slipping processing. The slip surface 21b may be, for example, a surface with a smaller surface roughness than the holding surface 21a. The surface roughnesses may be compared with one another using, for example, arithmetic average heights Ra. The slip surface 21b may be formed of, for example, a material with low coefficient of friction. Furthermore, the slip surface 21b may be configured by providing minute projections to reduce the contact area, thus reducing the friction resistance. In this way, the surface at the back side of the holding surface 21a of the spatular portion 21 being the slip surface 21b facilitates the sliding even in a case where the slip surface 21b is in contact with the inner wall of the container T, when the spatular portion 21 is inserted into between the inner wall of the container T and the sidewall of the object O (see FIG. 6A and FIG. 6B). Accordingly, this can more increase the insertability of the spatular portion 21 into the clearance between the slip surface 21b and the inner wall of the container T.

The following describes further details of the spatular portion 21 of this embodiment with reference to FIG. 5A to FIG. 5C.

The spatular portion 21 of this embodiment includes a main body portion 31 and the bump portion 25 protruding from the main body portion 31.

The main body portion 31 includes an approximately cuboid base 31a, a tapered plate portion 31b that is continuous with the distal end side of the base 31a and gradually decreases in thickness to the distal end, and a connecting cylindrical portion 31c that is continuous with the proximal end side of the base 31a and connectable with the actuator portion 10. In the tapered plate portion 31b of this embodiment, the surface at one side (upper side in FIG. 5C) in the thickness direction of the spatular portion 21 is an inclined surface that is inclined with respect to the extending direction of the spatular portion 21 (the same direction as the axis direction of the tube 11). The inclined surface of the tapered plate portion 31b of this embodiment is a recessed curved surface. However, the configuration of the inclined surface is not limited to this. However, the inclined surface of the tapered plate portion 31b being a recessed curved surface is likely to be continuous with the recessed curved surface of the skirt 25b of the bump portion 25 without any steps. In the tapered plate portion 31b of this embodiment, the surface at the other side (lower side in FIG. 5C) in the thickness direction of the spatular portion 21 is a flat surface parallel to the extending direction of the spatular portion 21. However, the surface at the other side may be an inclined surface that is inclined with respect to the extending direction of the spatular portion 21 such that both surfaces of the tapered plate portion 31b mutually approach toward the distal end side.

The connecting cylindrical portion 31c is connected to the actuator portion 10, for example, such that the connecting portion 14C of the actuator portion 10 is internally fitted into the cylindrical portion 31c.

The bump portion 25 protrudes from the main body portion 31 toward one side (upper side in FIG. 5C) in the thickness direction of the spatular portion 21. More specifically, the bump portion 25 of this embodiment is provided at a position extending between the base 31a and the tapered plate portion 31b of the main body portion 31, in the extending direction of the spatular portion 21.

That is, in the spatular portion 21 of this embodiment, the above thin-walled portion 22 is formed by a part of the tapered plate portion 31b of the main body portion 31, which is located at the distal end side with respect to the bump portion 25 in the extending direction of the spatular portion 21. Moreover, in the spatular portion 21 of this embodiment, the above bump thick-walled portion 23 is formed by the bump portion 25 and a part overlapping with the bump portion 25 in the thickness direction of the spatular portion 21, of the base 31a and the tapered plate portion 31b of the main body portion 31. Furthermore, in the spatular portion 21 of this embodiment, the above connecting portion 24 is formed by the connecting cylindrical portion 31c of the main body portion 31.

Moreover, the holding surface 21a of the spatular portion 21 of this embodiment is formed by the surface at one side (upper side in FIG. 5C) in the thickness direction of the base 31a and the tapered plate portion 31b of the main body portion 31, and the bump surface of the bump portion 25. Furthermore, the slip surface 21b of the spatular portion 21 of this embodiment is formed by the surface at the other side (lower side in FIG. 5C) in the thickness direction of the base 31a and the tapered plate portion 31b of the main body portion 31.

The main body portion 31 and the bump portion 25 of this embodiment are formed of a single material such as rubber and resin. However, the configuration of the main body portion 31 and the bump portion 25 is not limited to this. The main body portion 31 and the bump portion 25 may be formed of, for example, different materials. As one example, the material forming the bump portion 25 may be a material with smaller elastic modulus than the main body portion 31. This can easily obtain a bump portion 25 that is likely to elastically deform when holding the object O (see FIG. 6A and FIG. 6B).

The main body portion 31 of this embodiment may include a slip layer forming the slip surface 21b. The slip layer may be a layer formed of a resin material with small coefficient of friction, such as fluorine resin. The above slip surface 21b may be formed by differentiating the surface roughnesses between the upper surface at the bump portion 25 side of the main body portion 31 and the lower surface at the opposite side. In this way, the slip surface 21b of the main body portion 31 may be obtained by various kinds of slipping processing.

The main body portion 31 of this embodiment includes the above base 31a, tapered plate portion 31b, and connecting cylindrical portion 31c. However, the configuration of the main body portion 31 is not limited to this. The main body portion 31 may have, for example, a configuration without the base 31a. The shape of the connecting cylindrical portion 31c of the main body portion 31 may also be designed as appropriate depending on the configuration of the connecting portion 14C of the actuator portion 10.

Figure 7B:
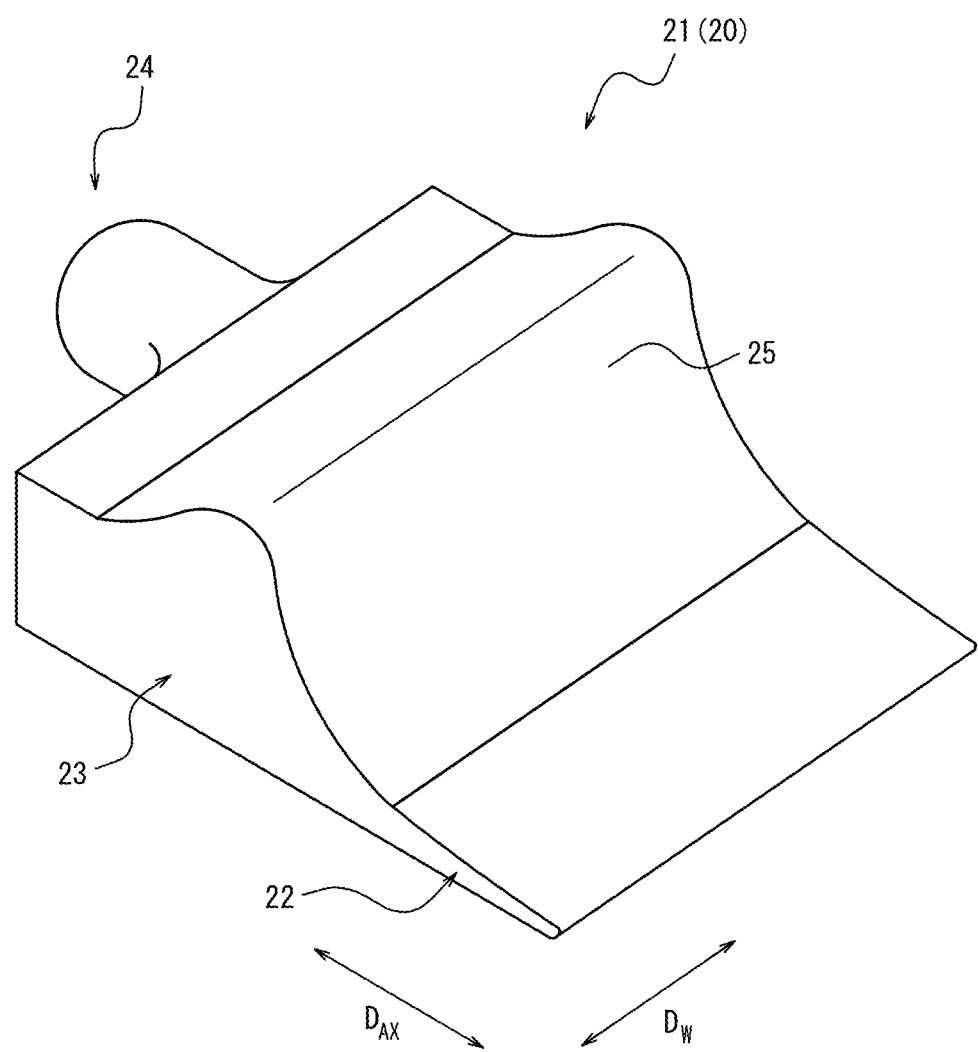
FIG. 7B is a drawing illustrating one modification of the attachment illustrated in FIG. 5A to FIG. 5C.
Figure 7C:
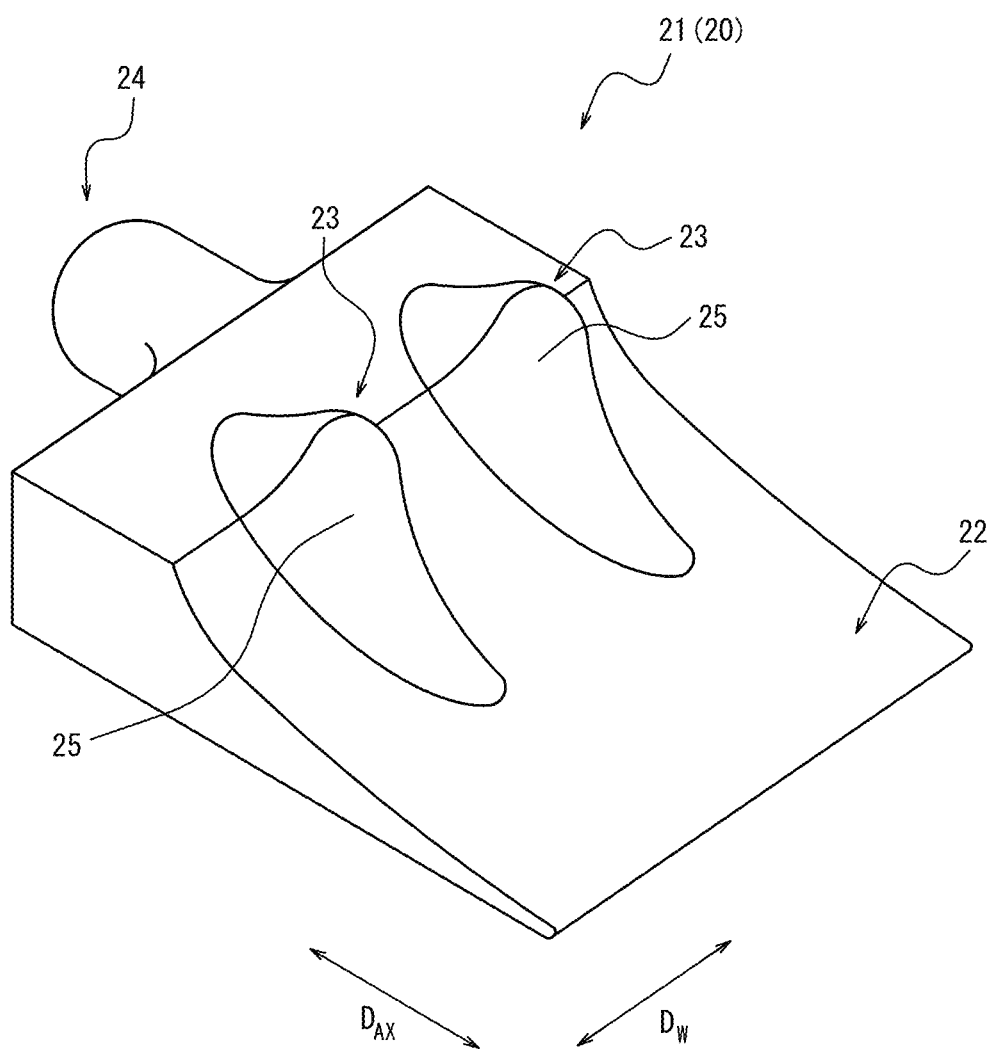
FIG. 7C is a drawing illustrating one modification of the attachment illustrated in FIG. 5A to FIG. 5C.

The following describes modifications of the spatular portion 21 as the attachment 20 with reference to FIG. 7A to FIG. 7C. FIG. 7A illustrates the spatular portion 21 in which the bump portion 25 is formed by the extensional membrane portion 26. The spatular portion 21 illustrated in FIG. 7A includes the main body portion 31 and the extensional membrane portion 26 as the bump portion 25 attached to the main body portion 31. The extensional membrane portion 26 is extensible by the fluid such as air. Specifically, the peripheral portion of the extensional membrane portion 26 illustrated in FIG. 7A is bonded to the main body portion 31 by adhesion, etc. The center of the extensional membrane portion 26 illustrated in FIG. 7A is not bonded to the main body portion 31 and defines a housing space 26a that can house the fluid with the main body portion 31. As illustrated in FIG. 7A, when the housing space 26a is fed with the fluid such as air through a tube 27, the extensional membrane portion 26 extends and protrudes on the holding surface 21a.

The bump portion 25 is not limited to the configuration protruding on the holding surface 21a in this way and may be configured to be able to protrude. The bump portion 25 being able to protrude can cause the bump portion 25 be in a contracted state without protruding, for example, when the spatular portion 21 is inserted into between the inner wall of the container T and the sidewall of the object O (see FIG. 6A and FIG. 6B). This can more increase the insertability of the spatular portion 21. Then, after the spatular portion 21 is inserted to a desired position between the inner wall of the container T and the sidewall of the object O, the bump portion 25 is extended to be in an extended state. This can stabilize the holding position of the object O by the bump portion 25. That is, the insertability into the clearance and the gripping performance to the object O to be held can be more increased.

The bump portion 25 that is able to protrude as illustrated in FIG. 7A is formed by the extensional membrane portion 26 that defines the housing space 26a with the main body portion 31. However, the configuration of the bump portion 25 is not limited to this. The bump portion 25 may be, for example, a balloon portion that is held on the main body portion 31 and internally defines a housing space.

As illustrated in FIG. 7B, the bump portion 25 may be arranged over the entire width direction of the spatular portion 21, or as illustrated in FIG. 7C, a plurality of bump portions 25 may be separately arranged in the width direction of the spatular portion 21. Each bump portion 25 illustrated in FIG. 7C has the same shape as the bump portion 25 illustrated in FIG. 5A. However, the shape of each bump portion 25 illustrated in FIG. 7C is not limited to this shape. For example, the bump portion 25 may be a fin-like plate portion projecting from the main body portion 31.

(System Using Fluid Pressure Actuator)

Figure 8:
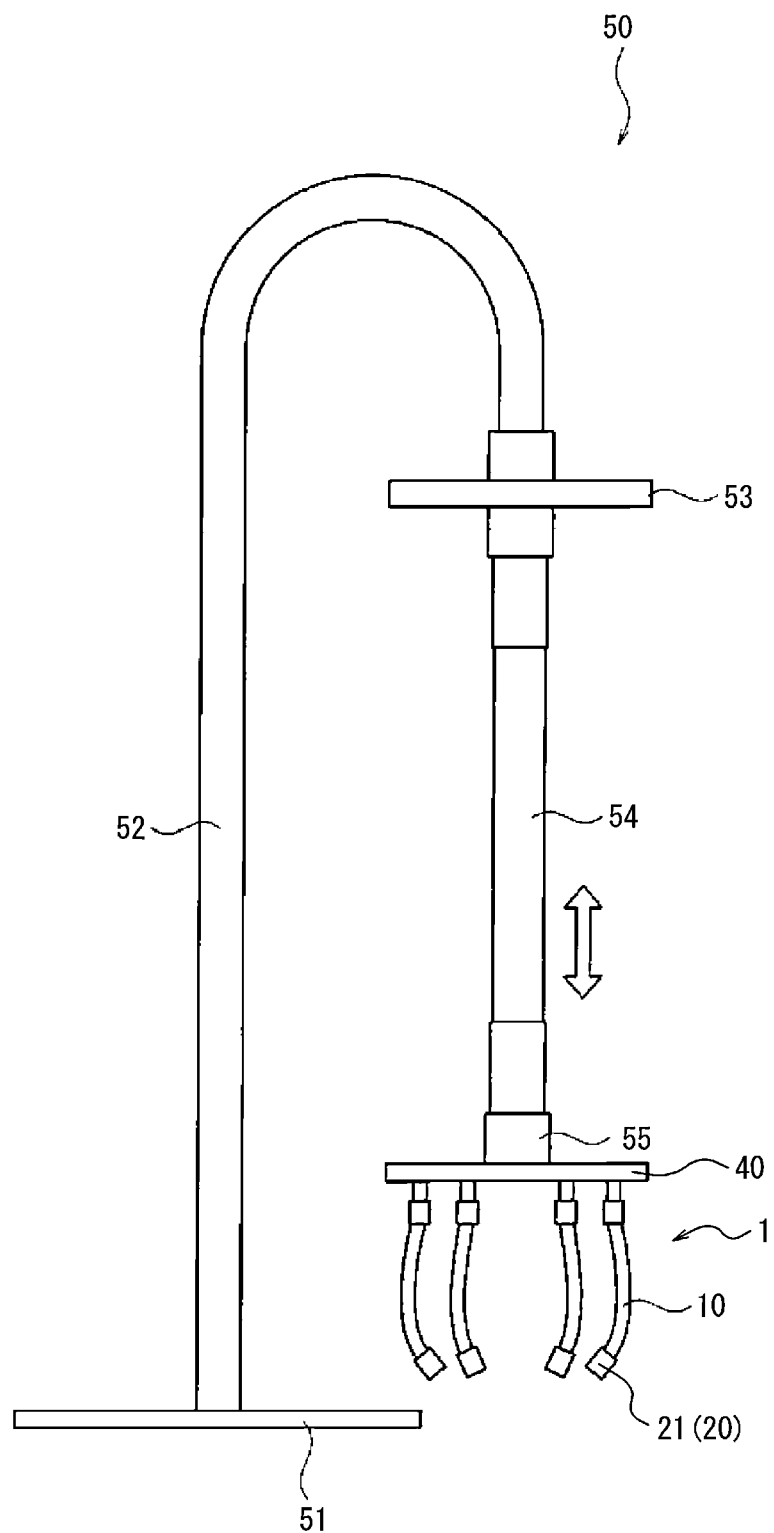
FIG. 8 is a schematic side view illustrating one configuration example of a system using the fluid pressure actuator illustrated in FIG. 1.

With reference to FIG. 8, one configuration example of a system using the fluid pressure actuator 1 will be described. FIG. 8 is a schematic side view illustrating one configuration example of the system using the fluid pressure actuator 1. Specifically, the system illustrated in FIG. 8 is a holding system 50 that drives the fluid pressure actuator 1 to hold an object.

As illustrated in FIG. 8, the holding system 50 includes a pedestal 51, a pillar 52, a first actuator connecting portion 53, a stretchable actuator 54, a second actuator connecting portion 55, and the fluid pressure actuator 1.

The pillar 52 stands upright on the upper surface of the pedestal 51. The upper end portion of the pillar 52 is folded downward, and the first actuator connecting portion 53 is connected to the distal end part of the pillar 52.

The stretchable actuator 54 is suspended from the first actuator connecting portion 53. The stretchable actuator 54 adjusts the position in the up-down direction of the fluid pressure actuator 1. The stretchable actuator 54 does not include the constraint member 17 as in the above fluid pressure actuator 1 and may be a common Mckibben type actuator. Accordingly, the stretchable actuator 54 contracts and expands along the axis direction (open arrow direction in the drawing). That is, the stretchable actuator 54 simply changes in length in the axis direction and cannot curve as the above fluid pressure actuator 1 having the constraint member 17. However, the stretchable actuator 54 may be able to curve by including the constraint member 17. The stretchable actuator 54 is not limited to a Mckibben type actuator and may be an actuator having another configuration.

The second actuator connecting portion 55 is connected to the lower edge of the stretchable actuator 54. The fluid pressure actuator 1 is suspended from the second actuator connecting portion 55.

In the example in the drawing, the fluid pressure actuator 1 includes four actuator portions 10 and one supporting portion 40 that supports the four actuator portions 10 at the proximal end side. The constraint member 17 is provided over the axis direction of the tube 11 on each of the four actuator portions 10. In each of the four actuator portions 10, the attachment 20 is continuous with the distal end side of the tube 11. However, the number of the fluid pressure actuators 1 supported by the supporting portion 40 is not limited to four. As described above, two fluid pressure actuators 1 may be supported by the supporting portion 40 (see FIG. 6A and FIG. 6B).

The fluid pressure actuator according to this disclosure is not limited to the specific configurations described in the above embodiments and modifications, and various variants, changes, and combinations are possible without departing from the claims.

INDUSTRIAL APPLICABILITY

This disclosure relates to a fluid pressure actuator.

REFERENCE SIGNS LIST 100 fluid pressure actuator
10 actuator portion
11 tube
12 sleeve
13 sealing portion (13A first sealing portion, 13B second sealing portion)
14 sealing member
14A head portion
14B body portion
14C connecting portion
14D connecting port
14E passage hole
15 locking ring
15A notch portion
16 caulking member 16A indentation
17 constraint member
20 attachment
21 spatular portion
21*a* holding surface
21*a*1 distal end-side holding surface
21*a*2 proximal end-side holding surface
21*b* slip surface
22 thin-walled portion
23 bump thick-walled portion
24 connecting portion
25 bump portion
25*a* apex
25*b* skirt
26 extensional membrane portion
26*a* housing space
27 tube
31 main body portion
31*a* base
31*b* tapered plate portion
31*c* connecting cylindrical portion
40 supporting portion
50 holding system
51 pedestal
52 pillar
53 actuator connecting portion
54 stretchable actuator
55 second actuator connecting portion
O object
T workbench
DAX axis direction
DR radial direction
DH thickness direction of the spatular portion
DW width direction of the spatular portion

The invention claimed is:

1. A fluid pressure actuator that expands and contracts by fluid pressure, comprising
an attachment attached to a distal end side,
wherein the attachment is a spatular portion including a holding surface at one side in the thickness direction, and
the spatular portion includes:
a thin-walled portion at the distal end side;
a bump thick-walled portion that is located at the proximal end side of the thin-walled portion and is thicker than the thin-walled portion by a bump portion that protrudes or is able to protrude on the holding surface; and
a slip surface with smaller friction than the holding surface, at the back side of the holding surface.

2. The fluid pressure actuator according to claim 1, comprising an actuator portion including a cylindrical tube and a sleeve that covers the outer circumferential surface of the tube,
wherein the attachment is continuous with the actuator portion at the distal end side in an axis direction of the cylindrical tube.

3. The fluid pressure actuator according to claim 1, wherein the holding surface of the spatular portion is continuous from the position of the thin-walled portion to the position of an apex of the bump portion of the bump thick-walled portion without any steps.

4. The fluid pressure actuator according to claim 1, wherein the bump portion is elastically deformable in the thickness direction.

5. The fluid pressure actuator according to claim 4, wherein the bump portion is formed by an extensional membrane portion that is extensible by fluid.

6. The fluid pressure actuator according to claim 2, wherein the holding surface of the spatular portion is continuous from the position of the thin-walled portion to the position of an apex of the bump portion of the bump thick-walled portion without any steps.

7. The fluid pressure actuator according to claim 2, wherein the bump portion is elastically deformable in the thickness direction.

8. The fluid pressure actuator according to claim 3, wherein the bump portion is elastically deformable in the thickness direction.

9. The fluid pressure actuator according to claim 6, wherein the bump portion is elastically deformable in the thickness direction.

10. The fluid pressure actuator according to claim 7, wherein the bump portion is formed by an extensional membrane portion that is extensible by fluid.

11. The fluid pressure actuator according to claim 8, wherein the bump portion is formed by an extensional membrane portion that is extensible by fluid.

12. The fluid pressure actuator according to claim 9, wherein the bump portion is formed by an extensional membrane portion that is extensible by fluid.

* * * * *